(12) United States Patent
Segawa

(10) Patent No.: US 10,059,366 B2
(45) Date of Patent: Aug. 28, 2018

(54) ELECTRICALLY DRIVEN POWER STEERING DEVICE

(71) Applicant: NSK LTD., Tokyo (JP)

(72) Inventor: Toru Segawa, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/500,295

(22) PCT Filed: Apr. 24, 2015

(86) PCT No.: PCT/JP2015/062574
§ 371 (c)(1),
(2) Date: Jan. 30, 2017

(87) PCT Pub. No.: WO2016/038927
PCT Pub. Date: Mar. 17, 2016

(65) Prior Publication Data
US 2017/0210412 A1    Jul. 27, 2017

(30) Foreign Application Priority Data

Sep. 8, 2014  (JP) .................................. 2014-181961
Feb. 13, 2015  (JP) .................................. 2015-025910

(51) Int. Cl.
*B62D 5/04*  (2006.01)
*F16H 1/16*  (2006.01)
*F16H 55/24*  (2006.01)

(52) U.S. Cl.
CPC ......... *B62D 5/0409* (2013.01); *B62D 5/0454* (2013.01); *F16H 1/16* (2013.01); *F16H 55/24* (2013.01)

(58) Field of Classification Search
CPC ............................ B62D 5/0409; B62D 5/0454
See application file for complete search history.

(56) References Cited

U.S. PATENT DOCUMENTS

| 8,528,687 B2 * | 9/2013 | Wilkes ................ B62D 5/0409 180/443 |
| 2007/0158131 A1 | 7/2007 | Iwasa et al. |

(Continued)

FOREIGN PATENT DOCUMENTS

| JP | 200837288 A | 2/2008 |
| JP | 2008143434 A | 6/2008 |

(Continued)

OTHER PUBLICATIONS

Communication issued by the European Patent Office dated Oct. 10, 2017 in counterpart European Patent Application No. 15840023.4.

(Continued)

*Primary Examiner* — Kevin Hurley
(74) *Attorney, Agent, or Firm* — Sughrue Mion, PLLC

(57) ABSTRACT

An electric power steering device includes a housing, a rotating shaft for steering, a worm wheel, a worm shaft, a tip side bearing, an electric motor, and biasing mechanism. The biasing mechanism includes a wedge piece and an elastic member for a wedge piece. The wedge piece is disposed between an outer circumferential surface of the tip side bearing and an inner circumferential surface of the housing in a state where the wedge piece in a circumferential direction is displaceable. The elastic member for a wedge piece applies elastic force toward one circumferential side to the wedge piece.

13 Claims, 14 Drawing Sheets

(56) References Cited

U.S. PATENT DOCUMENTS

| | | |
|---|---|---|
| 2010/0140011 A1 | 6/2010 | Wilkes et al. |
| 2010/0181139 A1 | 7/2010 | Tokura et al. |
| 2010/0243367 A1 | 9/2010 | Suzuki et al. |
| 2012/0272765 A1 | 11/2012 | Fueschel et al. |
| 2016/0068184 A1* | 3/2016 | Kimoto ............... B62D 5/0454 180/444 |

FOREIGN PATENT DOCUMENTS

| | | |
|---|---|---|
| JP | 2008173993 A | 7/2008 |
| JP | 4381024 B2 | 12/2009 |
| JP | 201047106 A | 3/2010 |
| JP | 2010221891 A | 10/2010 |
| JP | 2010228671 A | 10/2010 |
| JP | 2011255811 A | 12/2011 |
| JP | 20131273 A | 1/2013 |
| JP | 2013001273 A * | 1/2013 |
| JP | 5136286 B2 | 2/2013 |
| WO | 2008/087749 A1 | 7/2008 |
| WO | WO-2017002393 A1 * | 1/2017 ............... B62D 5/04 |

OTHER PUBLICATIONS

International Search Report dated Jul. 7, 2015, by the International Searching Authority in counterpart International Application No. PCT/JP2015/062574 (PCT/ISA/210).

Written Opinion dated Jul. 7, 2015, by the International Searching Authority in counterpart International Application No. PCT/JP2015/062574 (PCT/ISA/237).

Communication dated May 8, 2018, from the State Intellectual Property Office of People's Republic of China in counterpart Application No. 201580046682.2.

* cited by examiner

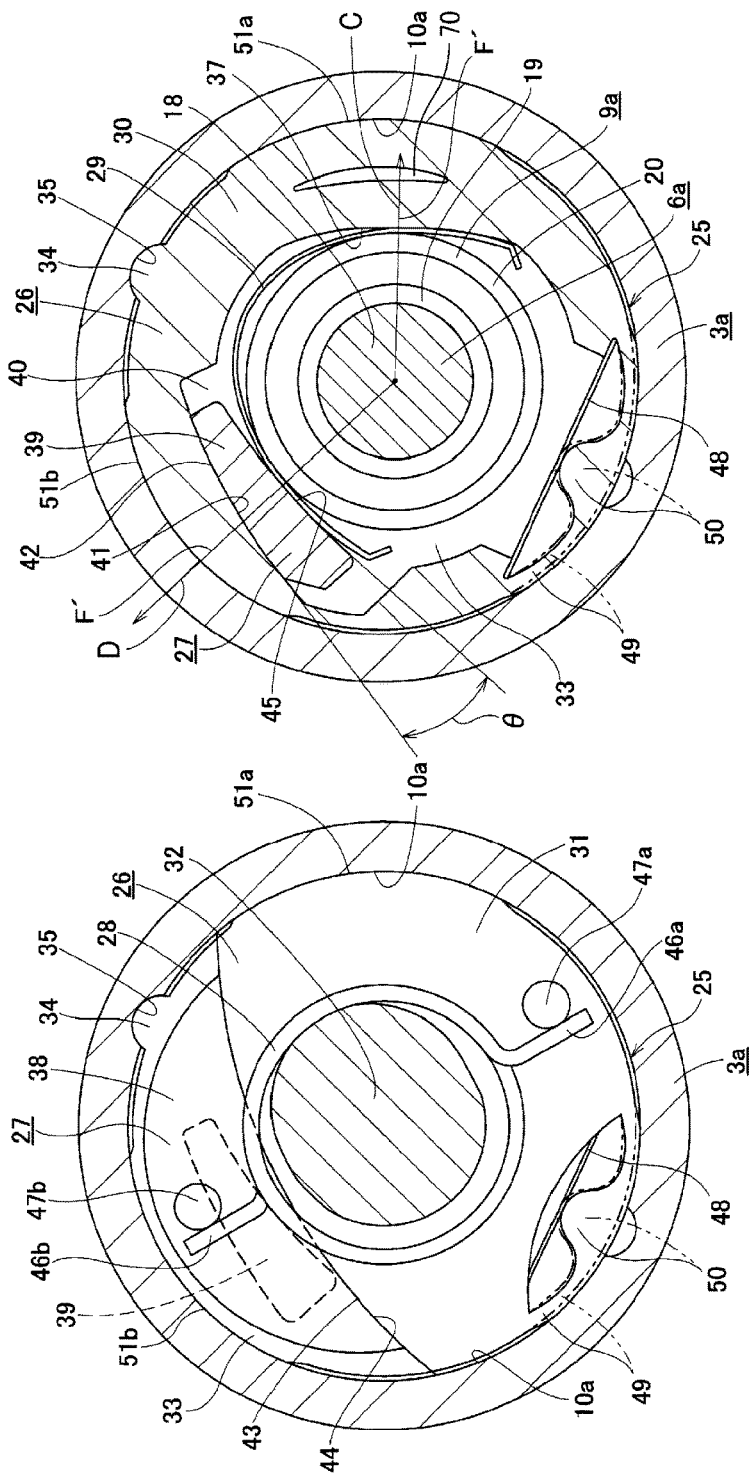

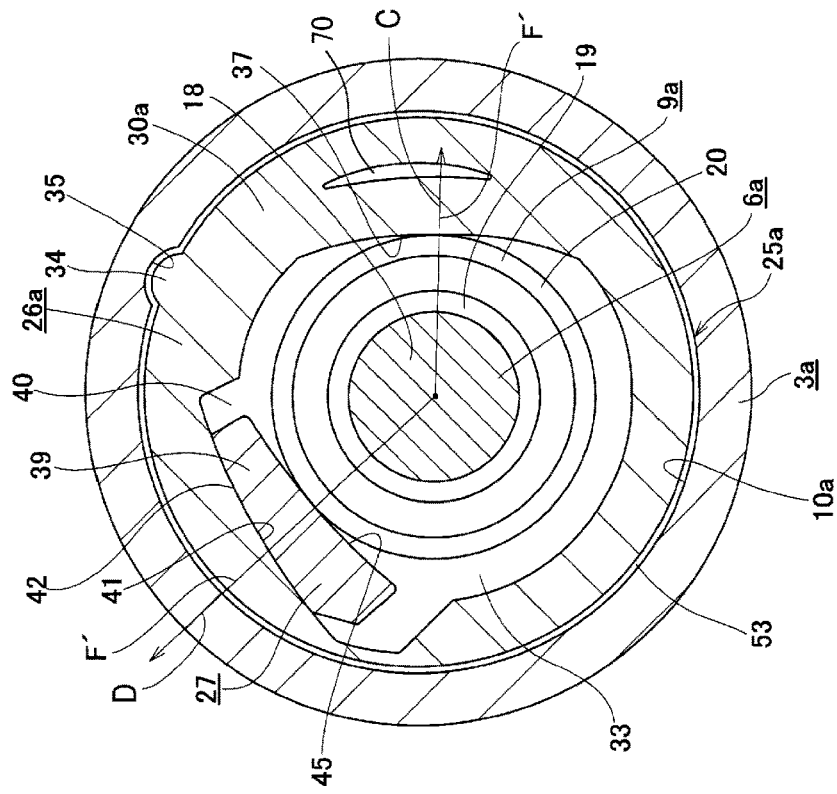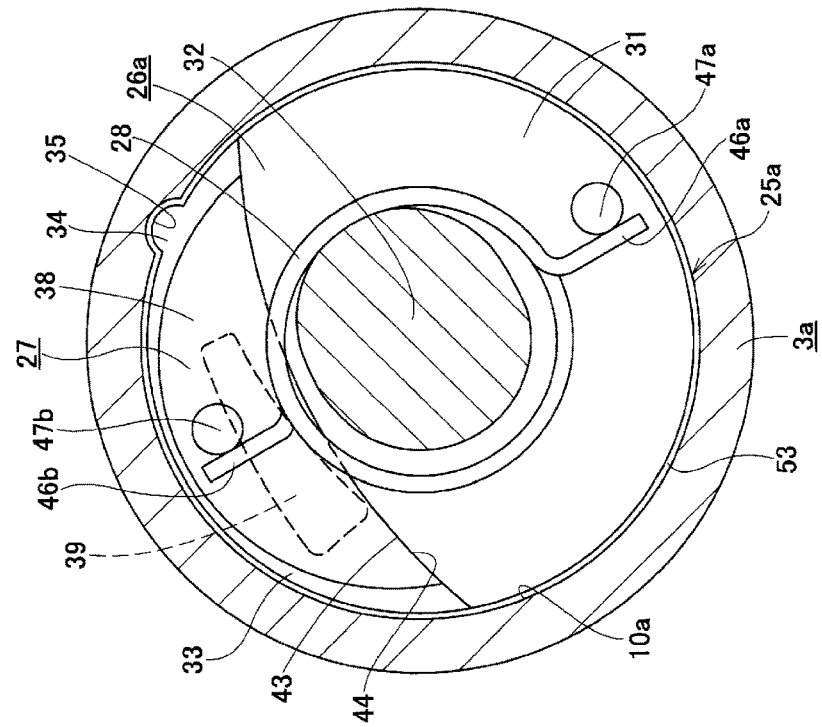

ELECTRICALLY DRIVEN POWER STEERING DEVICE

CROSS-REFERENCE TO RELATED APPLICATIONS

This application is a National Stage of International Application No. PCT/JP2015/062574 filed Apr. 24, 2015, claiming priority based on Japanese Patent Application No. 2014-181961 filed Sep. 8, 2014, and Japanese Patent Application No. 2015-025910 filed Feb. 13, 2015, the contents of all of which are incorporated herein by reference in their entirety.

TECHNICAL FIELD

The present invention relates to an electric power steering device and, more particularly, to an electric power steering device that is used as an automotive steering device and reduces a force required for a driver's steering wheel operation by using an electric motor as an auxiliary power source. In particular, the present invention relates to a technique for suppressing the generation of an uncomfortable and abnormal noise called a rattling noise at a worm-type speed reducer part that constitutes the electric power steering device.

BACKGROUND ART

A power steering device is in wide use as a device that reduces a force which is required for a driver's steering wheel operation when a steering angle is applied to a steering wheel (usually a front wheel except for the case of special vehicles such as forklifts). Electric power steering devices that use an electric motor as an auxiliary power source in such power steering devices are increasingly utilized as of late, too. The electric power steering device can be more compact in size and lighter in weight than a hydraulic power steering device and controlling a magnitude (torque) of auxiliary power is easier with the former than the latter. The other advantages of the electric power steering device include less engine energy loss.

Various structures have been known as the electric power steering device. In every case, the auxiliary power of the electric motor is applied via a speed reducer to a rotating shaft for steering that is rotated by the steering wheel operation and applies the steering angle to the steering wheel as a result of the rotation. In general, a worm-type speed reducer is used as the speed reducer. In the case of the electric power steering device that uses the worm-type speed reducer, the auxiliary power of the electric motor can be transferred to the rotating shaft for steering when a worm driven to rotate by the electric motor and a worm wheel rotating with the rotating shaft for steering mesh with each other.

As an example, a patent document 1 discloses the electric power steering device that is illustrated in FIGS. 10 and 11. In this electric power steering device, a front edge of a steering shaft 2 that is a rotating shaft for steering which is rotated in a predetermined direction by a steering wheel 1 is supported to be rotatable inside a housing 3 and a worm wheel 4 is fixed to the front edge of the steering shaft 2. In a state where the worm wheel 4 meshes with worm teeth 5 disposed in an axial intermediate portion of a worm shaft 6 driven to rotate by an electric motor 7, a base edge of the worm shaft 6 and a tip portion of the worm shaft 6 are rotatably supported inside the housing 3 by a base end side bearing 8 and a tip side bearing 9, respectively.

In most cases, the worm-type speed reducer that is based on the meshing of the worm wheel 4 and the worm teeth 5 has an inevitable backlash in a meshing portion of the worm wheel 4 and the worm teeth 5. This backlash results from an abrasion of a tooth surface of the worm wheel 4 and the worm teeth 5 as well as a dimensional error and an assembly error of each member constituting the worm-type speed reducer. In recent years, in particular, the amount of the abrasion is on the increase and the backlash is becoming more and more likely to occur as the auxiliary power tends to be increased. When the backlash is present in the meshing portion by any means, a jarring rattling noise might be generated in the meshing portion when the direction of the rotation of the steering shaft 2 is changed and when rotational vibration is applied from a wheel side to the steering shaft 2.

In the case of the structure that is illustrated herein, the worm teeth 5 are biased toward the worm wheel 4 by the worm shaft 6 being allowed to oscillate about the base end side bearing 8 such that the backlash in the meshing portion of the worm wheel 4 and the worm teeth 5 is removed.

For this reason, in the case of the structure that is illustrated herein, a holding recessed portion 10 is disposed at a part around the tip portion of the worm shaft 6 inside the housing 3 and a holder 11 is held and fixed inside the holding recessed portion 10. An outer ring constituting the tip side bearing 9 is internally fitted into and fixed to the holder 11 and an annular bush 12 formed of an elastic material is internally fitted into and fixed to an inner ring constituting the tip side bearing 9. A near-tip part of the worm shaft 6 is supported to be rotatable with respect to the holder 11 and be capable of a perspective motion with respect to the worm wheel 4 by the near-tip part of the worm shaft 6 being loosely inserted into the bush 12. At a part inside the holding recessed portion 10 that is adjacent to an axial outside of the holder 11 (right side in FIG. 11), a preload pad 13 is disposed to be capable of a displacement in relation to a meshing direction of the worm wheel 4 and the worm teeth 5 (vertical direction in FIG. 11). The tip portion of the worm shaft 6 is inserted into a through-hole disposed in a central portion of the preload pad 13 to be capable of relative rotation with respect to the preload pad 13 and without rattling in a radial direction. The tip portion of the worm shaft 6 is pressed toward the worm wheel 4 via the preload pad 13 by elastic force of a coil spring 14 laid across the preload pad 13 and the holder 11. In this manner, the worm teeth 5 are biased toward the worm wheel 4 by the worm shaft 6 being allowed to oscillate about the base end side bearing 8, and thus the backlash of the meshing portion of the worm teeth 5 and the worm wheel 4 is suppressed and the generation of the rattling noise in the meshing portion is suppressed.

As described above, in the case of the electric power steering device that is illustrated in FIGS. 10 and 11, the preload pad 13 is disposed inside the holding recessed portion 10 to be capable of the displacement relating to the meshing direction of the worm wheel 4 and the worm teeth 5 (vertical direction in FIG. 11), and a minute guide gap relating to a direction perpendicular to each of the meshing direction and an axial direction of the worm shaft 6 (front and rear direction in FIG. 11) is disposed between the preload pad 13 and a stationary member present therearound such that the displacement in the meshing direction is smoothly performed. Accordingly, inside the holding recessed portion 10, the preload pad 13 can also be displaced in the perpendicular direction (front and rear direction in FIG. 11) by the same amount as the guide gap. As a result, the worm teeth 5 can also be displaced in the perpendicular direction with respect to the worm wheel 4.

A meshing reaction force that is applied to the worm shaft 6 from the meshing portion of the worm wheel 4 and the worm teeth 5 includes not only a component in the meshing direction (vertical direction in FIG. 11) but also a component in the perpendicular direction (front and rear direction in FIG. 11). This point will be described below with reference to FIGS. 12 to 14.

As illustrated in FIGS. 12 to 14, the meshing reaction force is applied to the worm shaft 6 from the worm wheel 4 when a driving force is transferred from the worm shaft 6 to the worm wheel 4 by the worm shaft 6 being driven to rotate. In the case that is illustrated in FIG. 12 and the case that is illustrated in FIG. 13, the driving forces that are applied to the worm shaft 6 are equal to each other in magnitude but the driving forces that are applied to the worm shaft 6 have opposite directions of rotation. Accordingly, the worm wheel 4 rotates in the opposite directions in the case that is illustrated in FIG. 12 and the case that is illustrated in FIG. 13. In this state, apparent meshing reaction forces that have Fx, Fy, and Fz components of force, which are components in three respective directions of x, y, and z illustrated in FIGS. 12 and 13, are applied from the worm wheel 4 to the worm shaft 6 in the meshing portion of the worm wheel 4 and the worm teeth 5. Among these components of force Fx, Fy, and Fz, Fx and Fz are opposite in direction in the case of the rotation of the worm wheel 4 in one direction illustrated in FIG. 12 {direction illustrated by an arrow A in FIG. 12A} and in the case of the rotation of the worm wheel 4 in the other direction illustrated in FIG. 13 {direction illustrated by an arrow B in FIG. 13A}.

In a case where a distance between the meshing portion and an oscillation center o of the worm shaft 6 relating to the radial direction of the worm shaft 6 is d6, a moment M with a magnitude of d6*Fx acts on the worm shaft 6. Accordingly, in a case where a distance between the meshing portion and the oscillation center o relating to the axial direction of the worm shaft 6 is L6, a force Fr with a magnitude of M/L6 based on the moment M acts in the radial direction of the worm shaft 6 (upward direction in FIG. 12 and downward direction in FIG. 13). This force Fr is opposite in direction in the case illustrated in FIG. 12 and in the case illustrated in FIG. 13. Accordingly, a magnitude of an actual force Fy' in a y direction in which the moment M is taken into account and acting from the worm wheel 4 to the worm shaft 6 in the meshing portion decreases in a case where the worm wheel 4 rotates in one direction as illustrated in FIG. 12 (Fy'=Fy−Fr) and increases in a case where the worm wheel 4 rotates in the other direction as illustrated in FIG. 13 (Fy'=Fy+Fr). Accordingly, a resultant force F' of the actual meshing components of force in the y and z directions acting on the meshing portion decreases as illustrated by an arrow C in FIG. 14 in a case where the worm wheel 4 rotates in one direction and increases as illustrated by an arrow D in FIG. 14 in a case where the worm wheel 4 rotates in the other direction. As is apparent from the direction of the resultant force F', the meshing reaction force that is applied from the meshing portion to the worm shaft 6 includes the components relating to the meshing direction of the worm wheel 4 and the worm teeth 5 (vertical direction in FIGS. 12 to 14) and the direction perpendicular to the axial direction of the worm shaft 6 {front and rear direction in FIGS. 12A and 13A and lateral direction in FIGS. 12B, 13B, and 14} regardless of the direction of the rotation of the worm wheel 4.

Accordingly, in the case of the electric power steering device according to the prior art described above, the worm teeth 5 is displaced in the perpendicular direction with respect to the worm wheel 4 based on the component of the meshing reaction force in the perpendicular direction (front and rear direction in FIG. 11) when the meshing reaction force is applied from the meshing portion to the worm shaft 6. Accordingly, when the rotational vibration is applied from the wheel side to the steering shaft 2, the worm teeth 5 might vibrate in the perpendicular direction in the meshing portion and the jarring rattling noise might be generated.

PRIOR ART DOCUMENT

Patent Document

Patent Document 1: Japanese Patent No. 4381024

SUMMARY OF THE INVENTION

Problem to be Solved

The present invention, which has been made in view of the above-described circumstances, is to realize a structure that suppresses the generation of a rattling noise in a meshing portion of worm teeth and a worm wheel when rotational vibration is applied from a wheel side to a rotating shaft for steering by suppressing a displacement of the worm teeth relating to a direction perpendicular to each of a meshing direction of the worm teeth and the worm wheel and an axial direction of a worm shaft.

Means for Solving the Problem

An electric power steering device according to the present invention includes:
a housing;
a rotating shaft for steering disposed to be rotatable with respect to the housing and rotated by an operation of a steering wheel;
a worm wheel concentrically supported with respect to the rotating shaft for steering inside the housing and rotating with the rotating shaft for steering;
a worm shaft having worm teeth in an axial intermediate portion, the worm teeth meshing with the worm wheel;
a base end side bearing supporting a base edge of the worm shaft to be rotatable with respect to the housing;
a tip side bearing supporting a tip portion of the worm shaft to be rotatable with respect to the housing;
an electric motor having a tip portion of an output shaft engaged with the base edge of the worm shaft to be capable of turning force transmission; and
biasing mechanism for biasing the worm teeth toward the worm wheel by oscillating the worm shaft.

For example, the steering shaft 2, the intermediate shaft 15, or the input shaft (pinion shaft) 17 of the steering gear unit 16 in the aforementioned structure shown in FIG. 10 can be adopted as the rotating shaft for steering.

The biasing mechanism biases the worm teeth toward the worm wheel by allowing the worm shaft to oscillate around a base edge (for example, the base end side bearing) or an intermediate portion of the worm shaft.

In the case of the electric power steering device according to the present invention, in particular, the tip side bearing is externally fitted into and supported by the tip portion of the worm shaft. An annular space is present between an outer circumferential surface of the tip side bearing and an inner circumferential surface of the housing.

The biasing mechanism includes a guide piece, a wedge piece, and an elastic member for a wedge piece.

The guide piece is disposed in the annular space in a state where a displacement relating to a circumferential direction of the annular space is blocked and has a guide surface in contact, directly or via another member, with a circumferential part (for example, in the outer circumferential surface, a part that exists on one side with respect to the direction perpendicular to each of the meshing direction of the worm teeth and the worm wheel and the axial direction of the worm shaft) of the outer circumferential surface of the tip side bearing.

The wedge piece is disposed in the annular space in a state where the displacement relating to the circumferential direction of the annular space is allowed and has a wedge surface in contact, directly or via another member, with a part (for example, in the outer circumferential surface, a part that exists on the other side with respect to the perpendicular direction) of the outer circumferential surface of the tip side bearing spaced apart from the circumferential part in the circumferential direction.

The elastic member for a wedge piece applies elastic force toward one circumferential side of the annular space to the wedge piece.

The biasing mechanism allows the tip side bearing to be displaced toward the worm wheel by the wedge surface and the guide surface by allowing the wedge piece to be displaced toward the one circumferential side of the annular space by the elastic force of the elastic member for a wedge piece.

In a case where the present invention is carried out, preferably, the guide surface faces the outer circumferential surface of the tip side bearing in relation to a direction of a component of force (a component of force F' illustrated by one arrow among arrows C and D in FIG. 14) within a virtual plane orthogonal to the worm shaft pertaining to a meshing reaction force applied to the worm shaft from a meshing portion of the worm wheel and the worm teeth when the steering wheel is rotated to one side in a lateral direction. The wedge surface faces the outer circumferential surface of the tip side bearing in relation to a direction of a component of force (a component of force F' illustrated by the other arrow among arrows C and D in FIG. 14) within the virtual plane orthogonal to the worm shaft pertaining to a meshing reaction force applied to the worm shaft from the meshing portion when the steering wheel is rotated to the other side in the lateral direction.

In a case where the present invention is carried out, preferably, an elastic member for a bearing applying elastic force toward the worm wheel side to the tip side bearing is clamped at parts between the outer circumferential surface of the tip side bearing and the guide surface and between the outer circumferential surface of the tip side bearing and the wedge surface.

In a case where the present invention is carried out, preferably, a contact position of an inside surface of the elastic member for a bearing and the outer circumferential surface of the tip side bearing and contact positions of an outside surface of the elastic member for a bearing with respect to the guide surface and the wedge surface remain deviated from each other in relation to a length direction of the elastic member for a bearing in a state where no meshing reaction force is applied to the worm shaft from the meshing portion of the worm wheel and the worm teeth.

In a case where the present invention is carried out, preferably, a guiding face for a wedge piece is disposed at a part spaced apart from the guide surface in relation to the circumferential direction on an inner circumferential surface of the guide piece, and the wedge piece has a guided surface conforming to the guiding face for a wedge piece and is guided to be capable of the displacement in relation to the circumferential direction of the annular space.

In a case where the present invention is carried out, preferably, the guide piece is formed to have an annular shape surrounding the tip side bearing, the guide piece is loosely and internally fitted into the inner circumferential surface of the housing, and an elastic member for a guide piece applying elastic force toward the worm wheel side to the guide piece is clamped between an outer circumferential surface of the guide piece and the inner circumferential surface of the housing.

In a case where the present invention is carried out, preferably, the displacement of the guide piece relating to the circumferential direction of the annular space is blocked by an engaging projection portion or an engaging recessed portion formed at a circumferential part of the outer circumferential surface of the guide piece being engaged with an engaging recessed portion or an engaging projection portion formed at a circumferential part of the inner circumferential surface of the housing.

Effects of Invention

In the case of the electric power steering device according to the present invention that is configured as described above, the tip side bearing can be displaced toward the worm wheel by the wedge surface and the guide surface since the wedge piece is displaced toward one side in the circumferential direction of the annular space by the elastic force of the elastic member for a wedge piece. Accordingly, backlash of the meshing portion of the worm teeth and the worm wheel can be removed by the worm shaft being oscillated and the worm teeth being biased toward the worm wheel.

In the case of the present invention, the guide surface and the wedge surface are in contact with two circumferential parts of the outer circumferential surface of the tip side bearing. Accordingly, components of the component of force within the virtual plane orthogonal to the worm shaft that pertain to the meshing reaction force applied to the worm shaft from the meshing portion and relate to the direction perpendicular to each of the meshing direction of the worm teeth and the worm wheel and the axial direction of the worm shaft can be borne by the guide surface and the wedge surface. Accordingly, a displacement of the tip side bearing in the perpendicular direction can be suppressed.

Accordingly, a displacement of the worm teeth in the perpendicular direction with respect to the worm wheel can be suppressed.

As a result, the generation of a rattling noise that is attributable to a perpendicular vibration of the worm teeth in the meshing portion which is caused when rotational vibration is applied from a wheel side to the rotating shaft for steering can be suppressed.

When directions in which the guide surface and the wedge surface face the outer circumferential surface of the tip side bearing are regulated in predetermined directions, in particular, the component relating to the perpendicular direction can be efficiently borne by the guide surface and the wedge surface.

A perspective motion of the tip side bearing with respect to the worm wheel can be allowed based on an elastic deformation of the elastic member for a bearing or the elastic member for a guide piece in a case where the tip side bearing tends to exhibit the perspective motion with respect to the worm wheel as a result of a change in a meshing position of the worm teeth and the worm wheel based on a dimensional error in the direction of rotation of the worm shaft and the worm wheel during the rotation of the worm shaft and the worm wheel. As a result, a change in a biasing force of the worm teeth with respect to the worm wheel is suppressed, and a change in a frictional force that acts on the meshing portion is suppressed.

BRIEF DESCRIPTION OF DRAWINGS

FIG. 3A is a cross sectional view taken along line III-III in FIG. 2, and FIG. 3B is a cross sectional view taken alone line III'-III' in FIG. 2.

FIG. 6A is a cross sectional view taken along line VI-VI in FIG. 5, and FIG. 6B is a cross sectional view taken along line VI'-VI' in FIG. 5.

DESCRIPTION OF EMBODIMENTS

First Embodiment

A first embodiment of the present invention will be described with reference to FIGS. 1 to 4.

Figure 10:
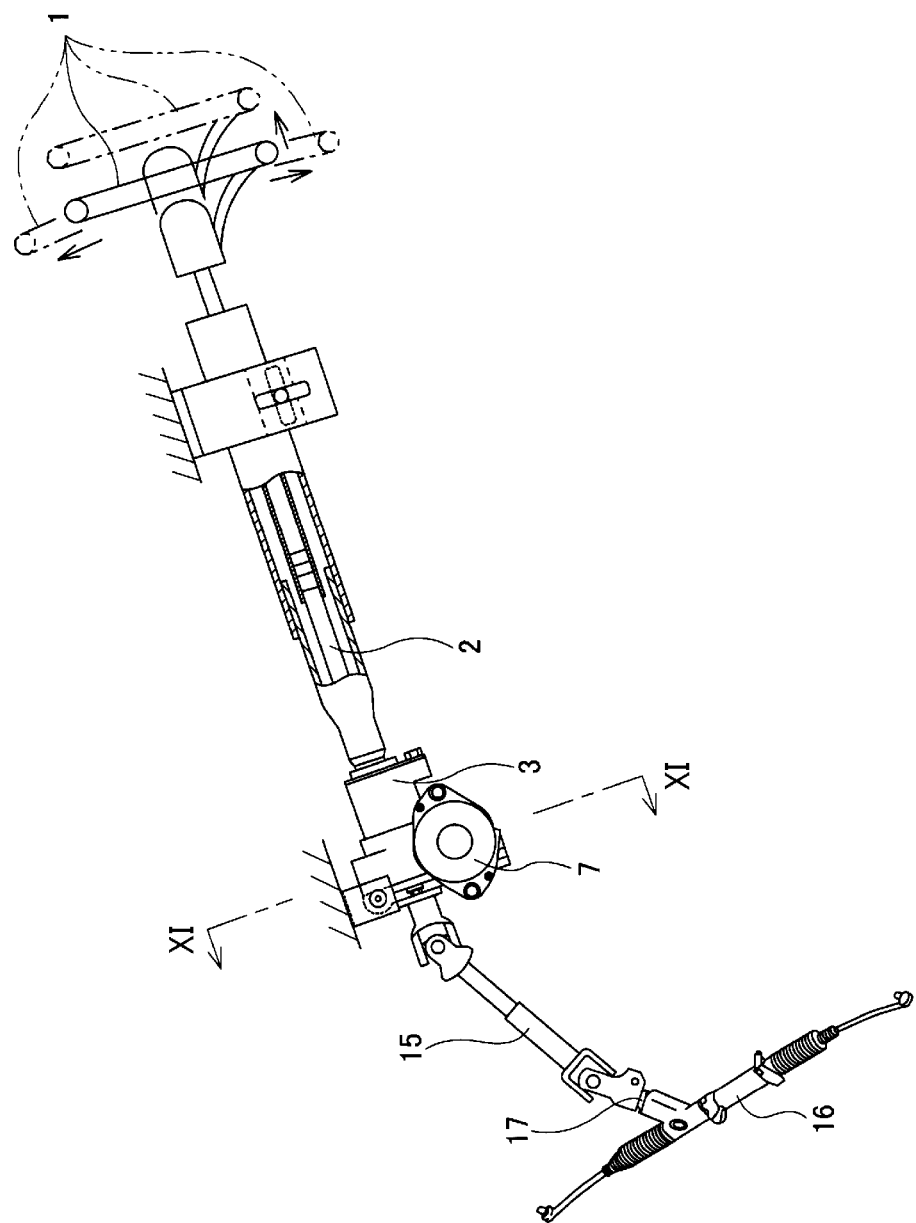
FIG. 10 is a partially cut side view illustrating an example of a structure according to the prior art.
Figure 11:
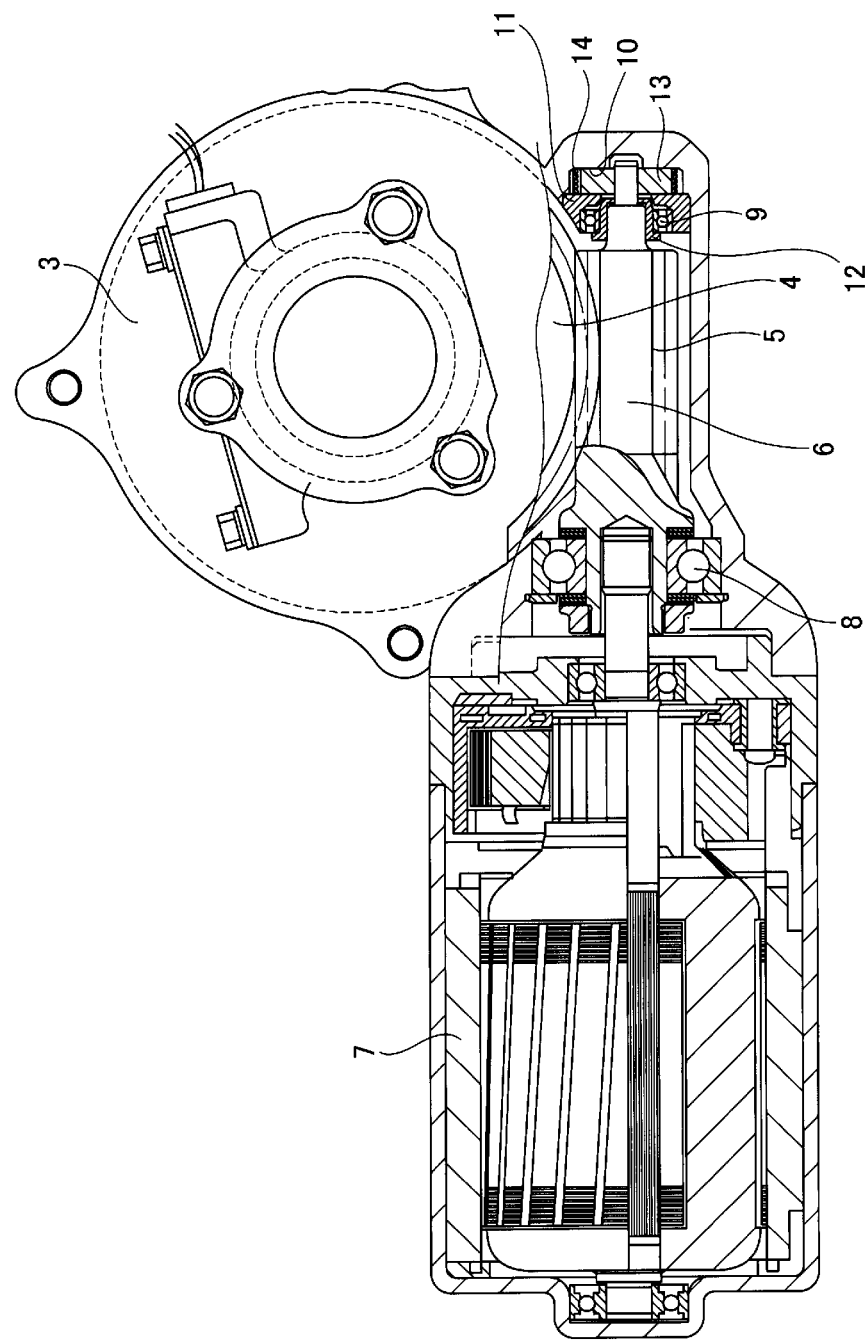
FIG. 11 is an enlarged sectional view taken along line XI-XI in FIG. 10.
Figures 12A, 12B:
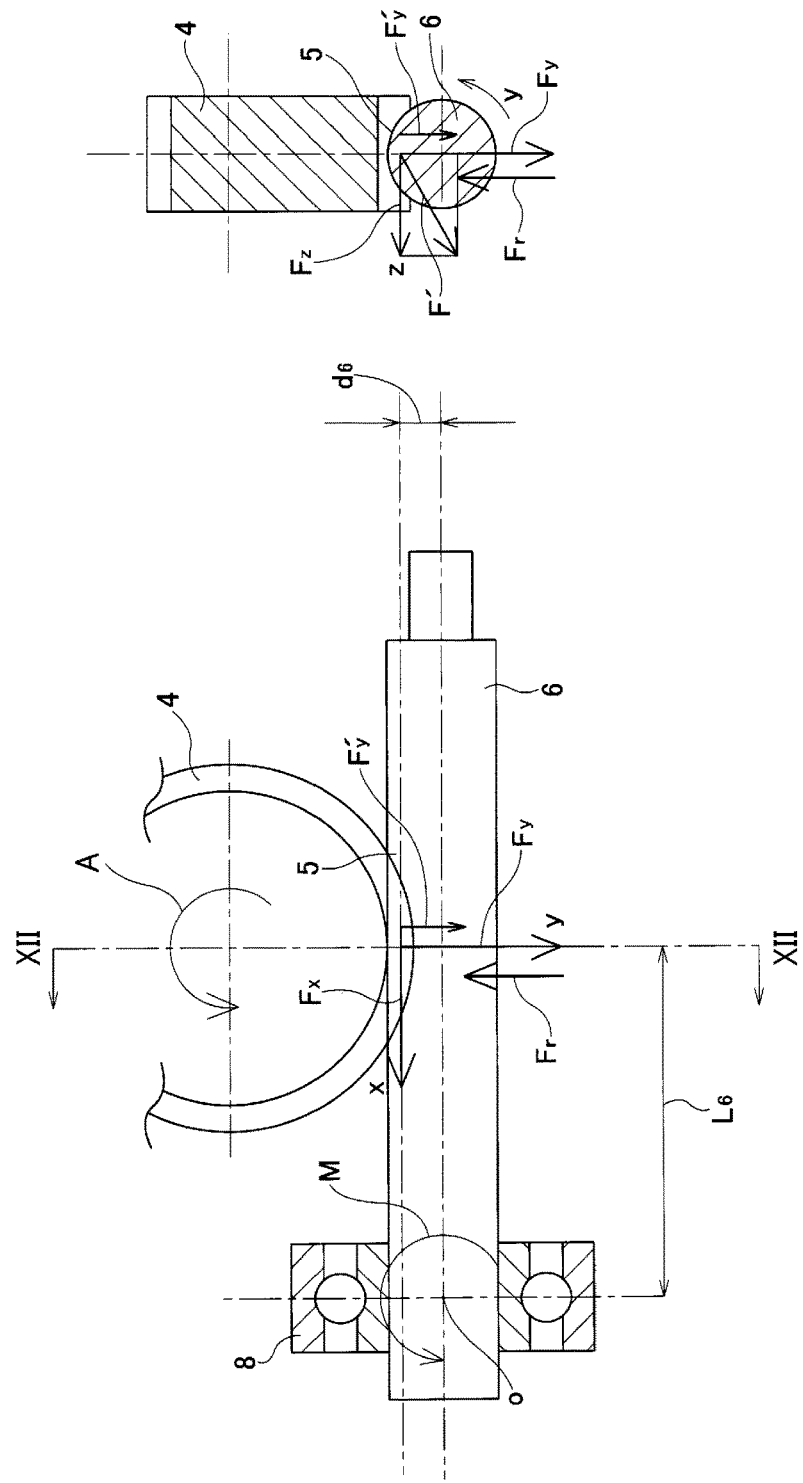
FIG. 12A is a schematic cross sectional view for showing a direction of a meshing reaction force that is applied from a worm wheel to a worm shaft when an electric motor is driven to rotate in a predetermined direction.
FIG. 12B is a cross sectional view taken along line XII-XII in FIG. 12A.
Figures 13A, 13B:
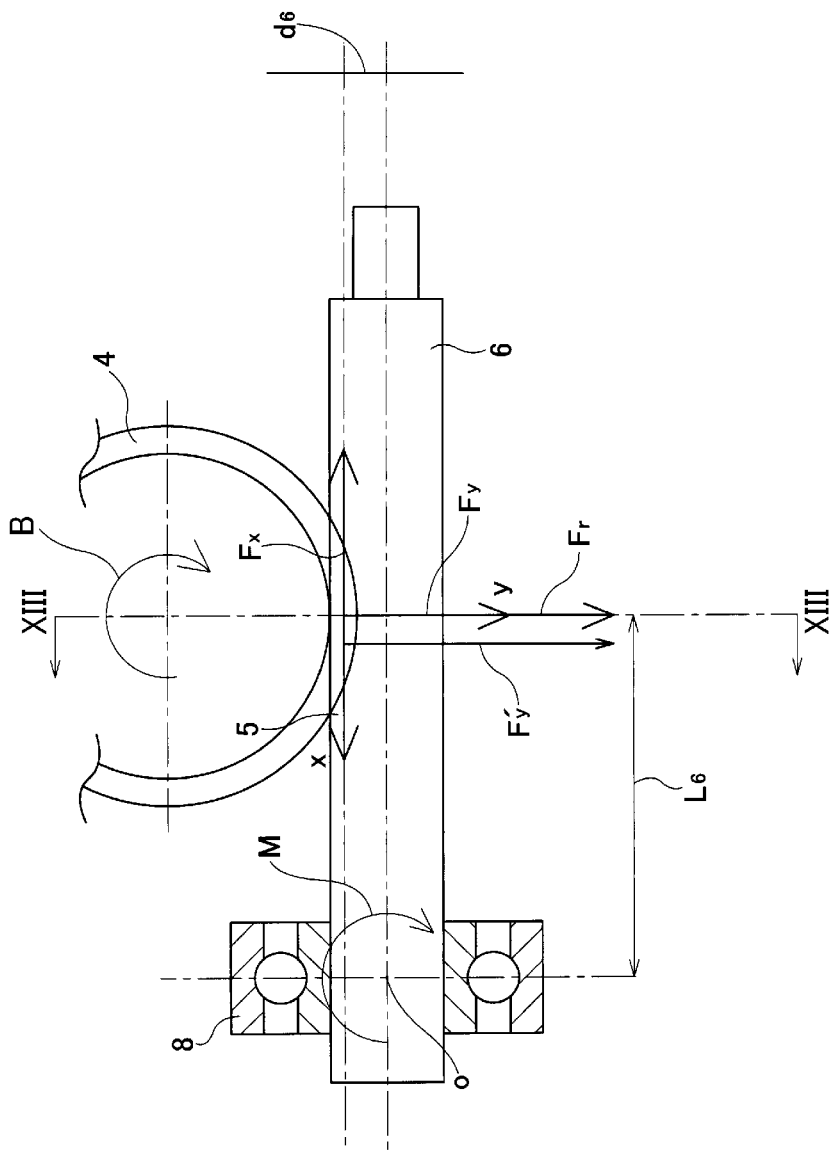
FIG. 13A is a schematic cross sectional view for showing the direction of the meshing reaction force that is applied from the worm wheel to the worm shaft when the electric motor is driven to rotate in the direction which is opposite to the predetermined direction.
FIG. 13B is a cross sectional view taken along line XIII-XIII in FIG. 13A.

A characteristic of an electric power steering device according to this embodiment consists in that a structure of biasing mechanism for biasing a tip portion of a worm shaft 6a toward a worm wheel 4 is devised. The structures and effects of the other parts are almost the same as those of the structure according to the prior art that is illustrated above with reference to FIGS. 10 and 11, and thus the following description will focus on characteristic parts of this embodiment with the illustration and description of the identical parts omitted or simplified. Although FIG. 11 described above and FIG. 1 for this embodiment differ from each other in terms of the direction in which an electric motor 7 is mounted on a housing 3a, it can be appropriately changed on a design basis depending on in-car installation, and thus has nothing to do with the characteristic parts of the present invention.

Even in the case of this embodiment, the worm shaft 6a has worm teeth 5 in an axial intermediate portion, and a base edge of the worm shaft 6a that is one of both axial edges of the worm shaft 6a which is closer to the electric motor 7 is supported to be rotatable with respect to the housing 3a by a base end side bearing 8a that is a single-row deep groove ball bearing, a four-point contact ball bearing, or the like and a tip portion thereof which is more distant from the electric motor 7 is supported to be rotatable with respect to the housing 3a by a tip side bearing 9a that is a single-row deep groove ball bearing in a state where the worm teeth 5 mesh with the worm wheel 4. The base end side bearing 8a supports the worm shaft 6a such that a slight oscillational displacement is possible with respect to the housing 3a.

The tip side bearing 9a is externally fitted into and supported by a small diameter portion 18 that is disposed in the tip portion of the worm shaft 6a. Accordingly, in the case of this embodiment, an inner ring 19 that constitutes the tip side bearing 9a is externally fitted into and fixed to the small diameter portion 18 in an interference fit. A holding recessed portion 10a, which is larger in diameter than an outer circumferential surface of an outer ring 20 constituting the tip side bearing 9a and has a cylindrical inner circumferential surface, is disposed at a part around the tip side bearing 9a inside the housing 3a, and an axial outer edge (left edge in FIGS. 1 and 2) of the holding recessed portion 10a is open to the outside of the housing 3a. The outer end opening of the holding recessed portion 10a is blocked by a cap 21 that is formed in a bottomed cylindrical shape by a metal plate. The cap 21 is provided with a fitted cylindrical portion 22 that has a cylindrical shape, a disk-shaped bottom plate portion 23 that blocks an axial inner end (right end in FIGS. 1 and 2) opening of the fitted cylindrical portion 22, and a circular ring-shaped outward flange portion 24 that is disposed at an outer edge of the fitted cylindrical portion 22. The fitted cylindrical portion 22 is internally fitted into the axial outer edge of the holding recessed portion 10a by push-up (interference fit), and an inside surface of the outward flange portion 24 abuts against a part of an outer surface of the housing 3a around the opening portion of the holding recessed portion 10a. In this manner, the cap 21 is assembled with the opening portion of the holding recessed portion 10a in a state where positioning in an axial direction is attempted.

Biasing mechanism 25 is assembled at a part around the tip side bearing 9a inside the holding recessed portion 10a. The tip portion of the worm shaft 6a is biased toward the worm wheel 4 via the tip side bearing 9a by the biasing mechanism 25. In this manner, the worm shaft 6a is allowed to oscillate about the base end side bearing 8a and the worm teeth 5 are biased toward the worm wheel 4, and thus backlash of a meshing portion of the worm teeth 5 and the worm wheel 4 is removed. The biasing mechanism 25 is provided with a guide member 26, a wedge member 27, a coil spring 28 for a wedge piece that is an elastic member for a wedge piece, and a leaf spring 29 for a bearing that is an elastic member for a bearing.

The guide member 26 is integrally formed of synthetic resin. The guide member 26 is provided with a guide piece 30 that has a substantially cylindrical shape, a side plate portion 31 that has an outer circumferential portion connected to an axial outer edge (left edge in FIG. 2) of the guide piece 30, and a core portion 32 that has a substantially columnar shape and is disposed in a state of protruding in the axial direction from a substantially central portion of an outside surface of the side plate portion 31. The guide piece 30 is arranged, in a state where displacements relating to a radial direction, a circumferential direction, and the axial direction are blocked, in an annular space 33 that is present between the outer circumferential surface of the outer ring 20 constituting the tip side bearing 9a and the inner circumferential surface of the holding recessed portion 10a. Accordingly, the guide piece 30 is internally fitted into an axial inner edge (right edge in FIG. 2) that is a part of the inner circumferential surface of the holding recessed portion 10a which is superimposed on the outer circumferential surface of the outer ring 20 in the radial direction by push-up, and thus positioning in the radial direction is attempted and the displacement in the radial direction is blocked. In addition, positioning in the circumferential direction is attempted and the displacement in the circumferential direction is blocked by an engaging projection portion 34, which is formed at a circumferential part of an outer circumferential surface of the guide piece 30, being engaged with an engaging recessed portion 35 that is formed over an entire axial length at a circumferential part of the inner circumferential surface of the holding recessed portion 10a. In addition, positioning in the axial direction is attempted and the displacement in the axial direction is blocked by an axial inside surface of the guide piece 30 and an axial outer end face (tip surface) of the core portion 32 abutting against a stepped surface 36 disposed at a part of an inner circumferential surface of the housing 3a between the holding recessed portion 10a and a part adjacent to an axial inside of the holding recessed portion 10a (part facing the worm teeth 5 in the radial direction) and an inside surface of the bottom plate portion 23 constituting the cap 21, respectively (the guide member 26 being clamped in the axial direction between the stepped surface 36 and the bottom plate portion 23).

The displacement of the guide piece 30 relating to the circumferential direction may be blocked by an engaging recessed portion that is formed at a circumferential part of the outer circumferential surface of the guide piece 30 being engaged with an engaging projection portion that is formed at a circumferential part of the inner circumferential surface of the housing 3a.

Figure 14:
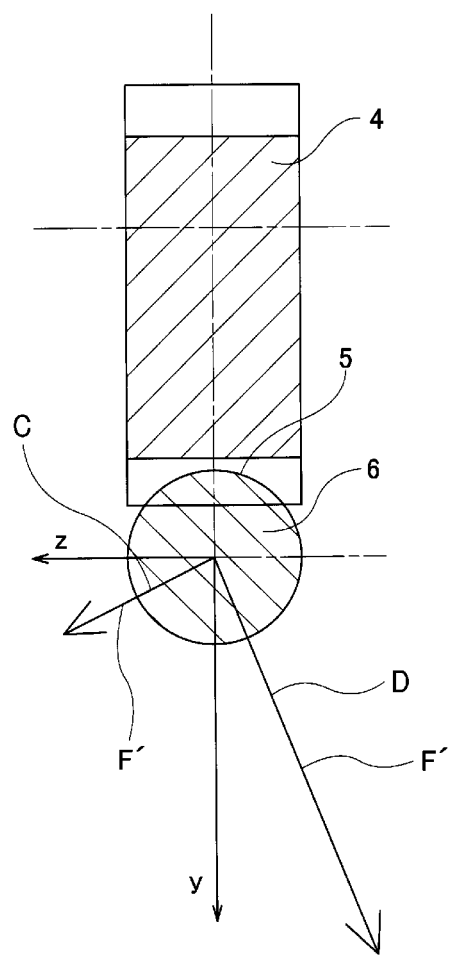
FIG. 14 is a drawing illustrating a bi-directional meshing reaction force that is applied from the worm wheel to the worm shaft when the electric motor is driven to rotate in two directions, which is similar to FIG. 12B.

A guide surface 37 that has a concave arc-shaped cross section is disposed at a part of an inner circumferential surface of the guide piece 30 that faces a circumferential part of the outer circumferential surface of the outer ring 20. The guide surface 37 faces the outer circumferential surface of the outer ring 20 in relation to a direction of a component of force within a virtual plane orthogonal to the worm shaft 6a (a component of force F' illustrated by an arrow C in FIGS. 3B and 14) that pertains to a meshing reaction force applied to the worm shaft 6a from the meshing portion of the worm wheel 4 and the worm teeth 5 when a steering wheel 1 (refer to FIG. 10) is rotated to one side in a lateral direction. A radius of curvature relating to a cross sectional shape of the guide surface 37 exceeds a radius of curvature (diameter/2) of the outer circumferential surface of the outer ring 20. In a case where the present invention is carried out, the cross sectional shape of the guide surface 37 can also be the shape of a straight line. When the cross sectional shape of the guide surface 37 is the shape of a concave arc as described above, however, a contact surface pressure of the guide surface 37 and the outer circumferential surface of the outer ring 20 (via the leaf spring 29 for a bearing described later) can be reduced.

A crescent-shaped slit 70 is formed in the guide piece 30. The crescent-shaped slit 70 passes through a phase radially outside the guide surface 37 becoming a phase subjected to a load from the leaf spring 29 in the axial direction.

The wedge member 27 is integrally formed of synthetic resin. The wedge member 27 is provided with a flat plate-shaped base portion 38 that has a crescent shape when viewed in the axial direction (shape shown in FIG. 3A) and a wedge piece 39 that is disposed in a state of protruding in the axial direction from a substantially central portion of an inside surface (right side surface in FIG. 3) of the base portion 38. The wedge piece 39 is inserted into the guide piece 30 through an insertion opening 40 that is disposed by a circumferential part of an outer circumferential side part of the side plate portion 31 constituting the guide member 26 being cut out and has a circumferential length exceeding that of the wedge piece 39. A displacement of the wedge piece 39 within a predetermined range that relates to the circumferential direction is allowed inside the guide piece 30 (in the annular space 33). Accordingly, in the case of this embodiment, a guiding face 41 for a wedge piece that has a concave arc-shaped cross section is disposed at a part of the inner circumferential surface of the guide piece 30 which is spaced apart from the guide surface 37 in relation to the circumferential direction. A guided surface 42, which is a curved surface that is disposed on an outer diameter side surface of the wedge piece 39, conforms to the guiding face 41 for a wedge piece, and has a convex arc-shaped cross section, is guided to be capable of a displacement in the circumferential direction by the guiding face 41 for a wedge piece. In addition, a guiding face 43 for a base portion that has a convex arc-shaped cross section and has the same center of curvature as the guiding face 41 for a wedge piece is disposed at a part of an outer circumferential surface of the side plate portion 31 which matches with the insertion opening 40. A guided surface 44, which is a curved surface that is disposed on a bore diameter side surface of the base portion 38, conforms to the guiding face 43 for a base portion, and has a concave arc-shaped cross section, is guided to be capable of a displacement in the circumferential direction by the guiding face 43 for a base portion.

A bore diameter side surface of the wedge piece 39 that faces a part which is spaced apart in the circumferential direction from a part of the outer circumferential surface of the outer ring 20 which the guide surface 37 faces is a wedge surface 45 that has a concave arc-shaped cross section. The wedge surface 45 faces the outer circumferential surface of the outer ring 20 in relation to a direction of a component of force within the virtual plane orthogonal to the worm shaft 6a {a component of force F' illustrated by an arrow D in FIGS. 3B and 14} that pertains to a meshing reaction force applied to the worm shaft 6a from the meshing portion of the worm wheel 4 and the worm teeth 5 when the steering wheel 1 is rotated to the other side in the lateral direction. A radius of curvature relating to a cross sectional shape of the wedge surface 45 exceeds the radius of curvature of the outer circumferential surface of the outer ring 20. The wedge surface 45 is inclined such that a thickness dimension of a part of the wedge piece 39 that is interposed between the wedge surface 45 and the guided surface 42 decreases toward one side in the circumferential direction {clockwise direction in FIGS. 3A and 3B}. In the case of this embodiment, a wedge angle θ, which is an inclination angle of the wedge piece 39 with respect to the guided surface 42, is five degrees to 15 degrees. In the case of this embodiment, the wedge piece 39 is displaced to the one side in the circumferential direction {clockwise direction in FIGS. 3A and 3B} along the guiding face 41 for a wedge piece by a relationship between the wedge angle θ and a direction in which the guiding face 41 for a wedge piece is formed being regulated, and thus the outer ring 20 (the tip side bearing 9a) can be displaced toward the worm wheel 4 via the leaf spring 29 for a bearing (described later) by the wedge surface 45 and the guide surface 37. In a case where the present invention is carried out, the cross sectional shape of the wedge surface 45 can also be the shape of a straight line. When the cross sectional shape of the wedge surface 45 is the shape of a concave arc as described above, however, a contact surface pressure of the wedge surface 45 and the outer circumferential surface of the outer ring 20 (via the leaf spring 29 for a bearing described later) can be reduced.

The coil spring 28 for a wedge piece is arranged at a position surrounding the core portion 32 constituting the guide member 26. In this state, engaging portions 46a and 46b that are disposed in both edges of a wire rod constituting the coil spring 28 for a wedge piece are engaged with pins 47a and 47b that are integrally disposed (or fixed as separate members) on the outside surface of the side plate portion 31 constituting the guide member 26 and an outside surface of the base portion 38 constituting the wedge member 27, respectively. In this state, the coil spring 28 for a wedge piece applies elastic force toward one side in the circumferential direction to the wedge piece 39 via the pin 47b and the base portion 38.

The leaf spring 29 for a bearing is formed to have a substantially U shape, and parts near both ends of the leaf spring 29 for a bearing in a length direction are elastically clamped at parts between the outer circumferential surface of the outer ring 20 and the guide surface 37 and between the outer circumferential surface of the outer ring 20 and the wedge surface 45. In other words, in the case of this embodiment, the guide surface 37 and the wedge surface 45 are in contact with the outer circumferential surface of the outer ring 20 via the parts near both of the ends of the leaf spring 29 for a bearing in the length direction, respectively.

Figure 1:
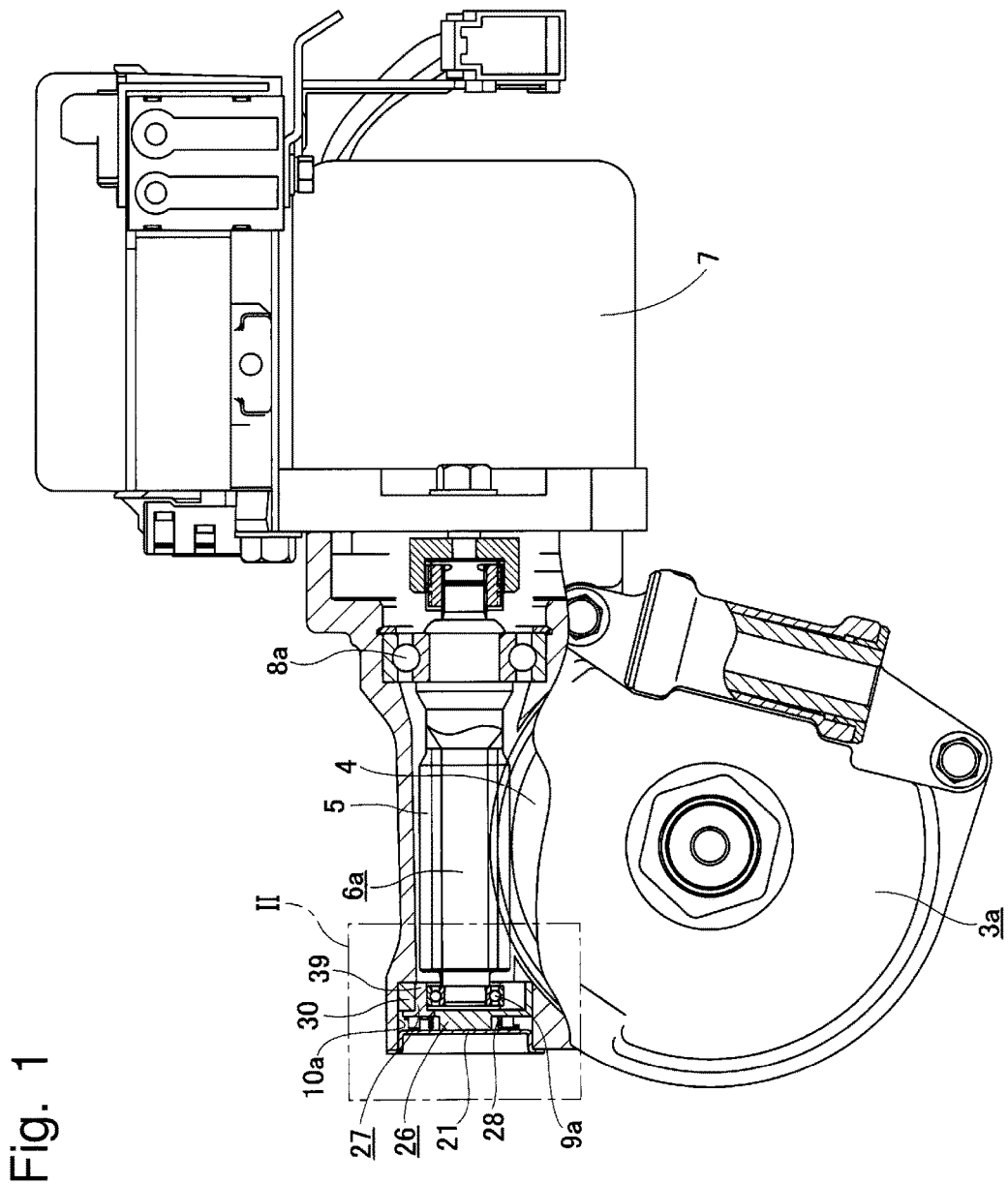
FIG. 1 is a drawing illustrating a first embodiment of the present invention, which corresponds to an enlarged cross section taken along line XI-XI in FIG. 10.
Figure 2:
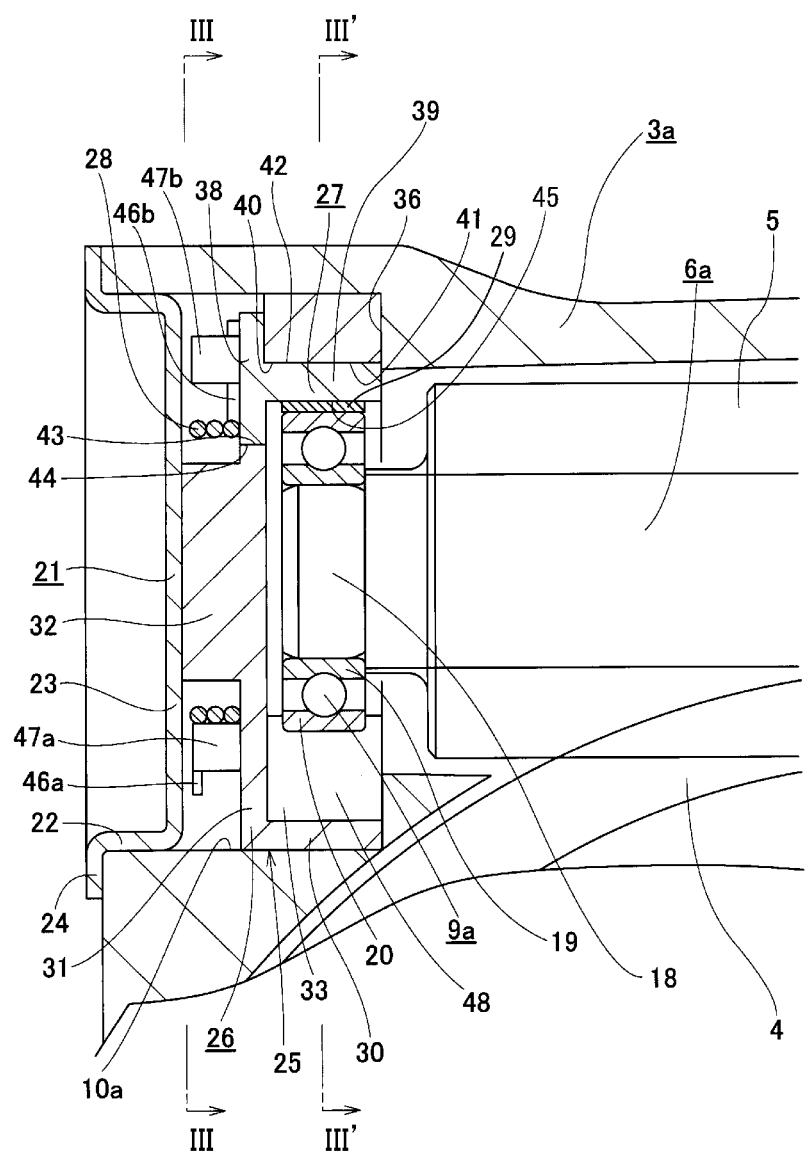
FIG. 2 is an enlarged view of section II in FIG. 1.
Figure 4A:
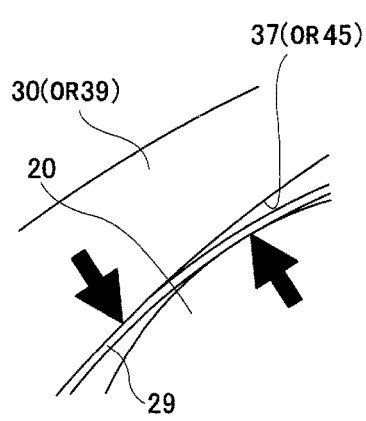
FIG. 4A is an enlarged view illustrating a part where an outer circumferential surface of an outer ring and a guide surface or a wedge surface are in contact with each other via a leaf spring for a bearing in a state where no meshing reaction force is applied.
Figure 4B:
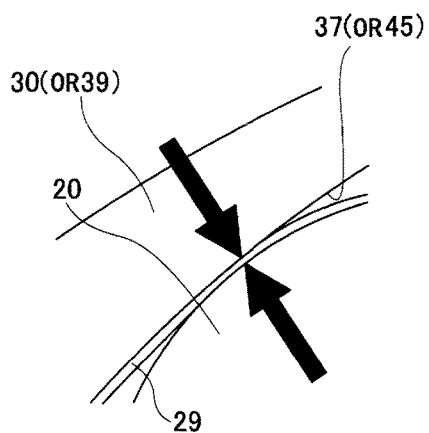
FIG. 4B is an enlarged view illustrating a state where a large meshing reaction force is applied to the same.

In the case of this embodiment, an inside surface of the parts near both of the ends of the leaf spring 29 for a bearing has a radius of curvature exceeding that of the outer circumferential surface of the outer ring 20 and outside surfaces of the parts near both of the ends of the leaf spring 29 for a bearing have a radius of curvature exceeded by those of the guide surface 37 and the wedge surface 45 at least in a state where no meshing reaction force is applied to the worm shaft 6a from the meshing portion of the worm wheel 4 and the worm teeth 5. Accordingly, at least in a state where no meshing reaction force is applied to the worm shaft 6a from the meshing portion, a contact position of the outer circumferential surface of the outer ring 20 with respect to the inside surface of the parts near both of the ends of the leaf spring 29 for a bearing and contact positions of the guide surface 37 and the wedge surface 45 with respect to the outside surfaces of the parts near both of the ends of the leaf spring 29 for a bearing remain deviated from each other in relation to the length direction of the leaf spring 29 for a bearing {refer to FIG. 4A}. In contrast, in a case where a significant meshing reaction force (with a magnitude not available in a normal operation state) is applied to the worm shaft 6a from the meshing portion, the parts near both of the ends of the leaf spring 29 for a bearing undergo a significant elastic deformation, and thus the contact position of the outer circumferential surface of the outer ring 20 with respect to the inside surface of the parts near both of the ends of the leaf spring 29 for a bearing and the contact positions of the guide surface 37 and the wedge surface 45 with respect to the outside surfaces of the parts near both of the ends of the leaf spring 29 for a bearing correspond to each other in relation to the length direction of the leaf spring 29 for a bearing {refer to FIG. 4B}. In other words, in the case of this embodiment, the shapes of the parts near both of the ends of the leaf spring 29 for a bearing elastically change to and from the shape that is illustrated in FIG. 4A and the shape that is illustrated in FIG. 4B depending on the magnitude of the meshing reaction force applied to the worm shaft 6a from the meshing portion, and thus a slight perspective motion of the tip side bearing 9a with respect to the worm wheel 4 can be allowed.

In the case of this embodiment, a leaf spring 48 for a preload is assembled at a part on the side opposite in the radial direction to a part interposed between the guide surface 37 and the guiding face 41 for a wedge piece and where the guide surface 37 and the guiding face 41 for a wedge piece approach each other in relation to the circumferential direction on the inner circumferential surface of the guide piece 30. A convex pressed portion 50 of the guide piece 30 that is disposed on an inner circumferential surface of a circular arc-shaped part 49 which is positioned on an outer diameter side of the leaf spring 48 for a preload is pressed radially outward by elastic force of the leaf spring 48 for a preload. Then, the circular arc-shaped part 49 is elastically deformed from the state that is illustrated by the chain lines in FIGS. 3A and 3B to the state that is illustrated by the solid lines in FIGS. 3A and 3B (radially outward), and an outer circumferential surface of the circular arc-shaped part 49 is strongly pressed toward the inner circumferential surface of the holding recessed portion 10a. In addition, based on a reaction force of this pressing, partial cylindrical surface portions 51a and 51b on the outer circumferential surface of the guide piece 30 that are respectively disposed at parts which are positioned on outer diameter sides of the guide surface 37 and the guiding face 41 for a wedge piece and larger in outer diameter dimension than the other parts (except for the outer circumferential surface of the circular arc-shaped part 49 and an outer circumferential surface of the engaging projection portion 34 after the elastic deformation) are strongly pressed toward the inner circumferential surface of the holding recessed portion 10a. In this manner, a state where the guide piece 30 is internally fitted into the holding recessed portion 10a by push-up as described above can be achieved. In addition, the components of force within the virtual plane orthogonal to the worm shaft 6a {the components of force F' illustrated by the arrows C and D in FIGS. 3B and 14} that pertain to the meshing reaction force applied to the worm shaft 6a from the meshing portion can be efficiently borne by the guide surface 37 and the wedge surface 45.

In a case where the structure of this embodiment described above is assembled, each member constituting the biasing mechanism 25 and the leaf spring 48 for a preload are assembled in advance outside the holding recessed portion 10a and prepared as units. In this case, the leaf spring 48 for a preload is assembled inside the guide piece 30 through an inner end opening of the guide piece 30. Then, in a state where the biasing mechanism 25 and the leaf spring 48 for a preload are prepared as units as described above, the biasing mechanism 25 and the leaf spring 48 for a preload are assembled inside the holding recessed portion 10a.

In the case of the electric power steering device according to this embodiment that is configured as described above, the wedge piece 39 is displaced toward one side in the circumferential direction by the elastic force of the coil spring 28 for a wedge piece, and thus the tip side bearing 9a can be displaced toward the worm wheel 4 (in a direction of a bisector of an angle formed by the wedge surface 45 and the guide surface 37) by the wedge surface 45 and the guide surface 37. Accordingly, the backlash of the meshing portion of the worm teeth 5 and the worm wheel 4 can be removed by the worm shaft 6a being allowed to oscillate about the base end side bearing 8a and the worm teeth 5 being biased toward the worm wheel 4.

A direction of the displacement of the tip side bearing 9a toward the worm wheel 4 can be adjusted when the angle formed by the wedge surface 45 and the guide surface 37 is changed.

In the case of this embodiment, directions in which the guide surface 37 and the wedge surface 45 face the outer circumferential surface of the outer ring 20 constituting the tip side bearing 9a are regulated in predetermined directions. In other words, the guide surface 37 faces the outer circumferential surface of the outer ring 20 in relation to the direction of the component of force within the virtual plane orthogonal to the worm shaft 6a {the component of force F' illustrated by the arrow C in FIGS. 3B and 14} that pertains to the meshing reaction force applied to the worm shaft 6a from the meshing portion when the steering wheel 1 is rotated to the one side in the lateral direction. The wedge surface 45 faces the outer circumferential surface of the outer ring 20 in relation to the direction of the component of force within the virtual plane orthogonal to the worm shaft 6a {the component of force F' illustrated by the arrow D in FIGS. 3B and 14} that pertains to the meshing reaction force applied to the worm shaft 6a from the meshing portion when the steering wheel 1 is rotated to the other side in the lateral direction. Accordingly, regardless of the direction of the rotation of the steering wheel 1 and the worm wheel 4, the component of force within the virtual plane orthogonal to the worm shaft 6a that pertains to the meshing reaction force applied to the worm shaft 6a from the meshing portion can be borne from a substantially front face by the guide surface 37 and the wedge surface 45. In other words, components of the component of force relating to the direction perpendicular to each of the meshing direction of the worm teeth 5 and the worm wheel 4 and the axial direction of the worm shaft 6a (lateral direction in FIG. 3) can be efficiently borne. Accordingly, a displacement of the tip side bearing 9a in this perpendicular direction can be suppressed. Accordingly, a displacement of the worm teeth 5 in the perpendicular direction with respect to the worm wheel 4 can be suppressed. As a result, the generation of a rattling noise that is attributable to a perpendicular vibration of the worm teeth 5 in the meshing portion which is caused when rotational vibration is applied from a wheel side to a steering shaft 2 (refer to FIG. 10) that is a rotating shaft for steering can be suppressed.

In the case of this embodiment, the perspective motion of the tip side bearing 9a with respect to the worm wheel 4 can be allowed based on the elastic deformation of the leaf spring 29 for a bearing in a case where the tip side bearing 9a tends to exhibit the perspective motion with respect to the worm wheel 4 as a result of a change in the meshing position of the worm teeth 5 and the worm wheel 4 based on a dimensional error in the direction of rotation of the worm shaft 6a and the worm wheel 4 during the rotation of the worm shaft 6a and the worm wheel 4. As a result, a change in a biasing force of the worm teeth 5 with respect to the worm wheel 4 is suppressed, and a change in a frictional force that acts on the meshing portion is suppressed.

Second Embodiment

Figure 5:
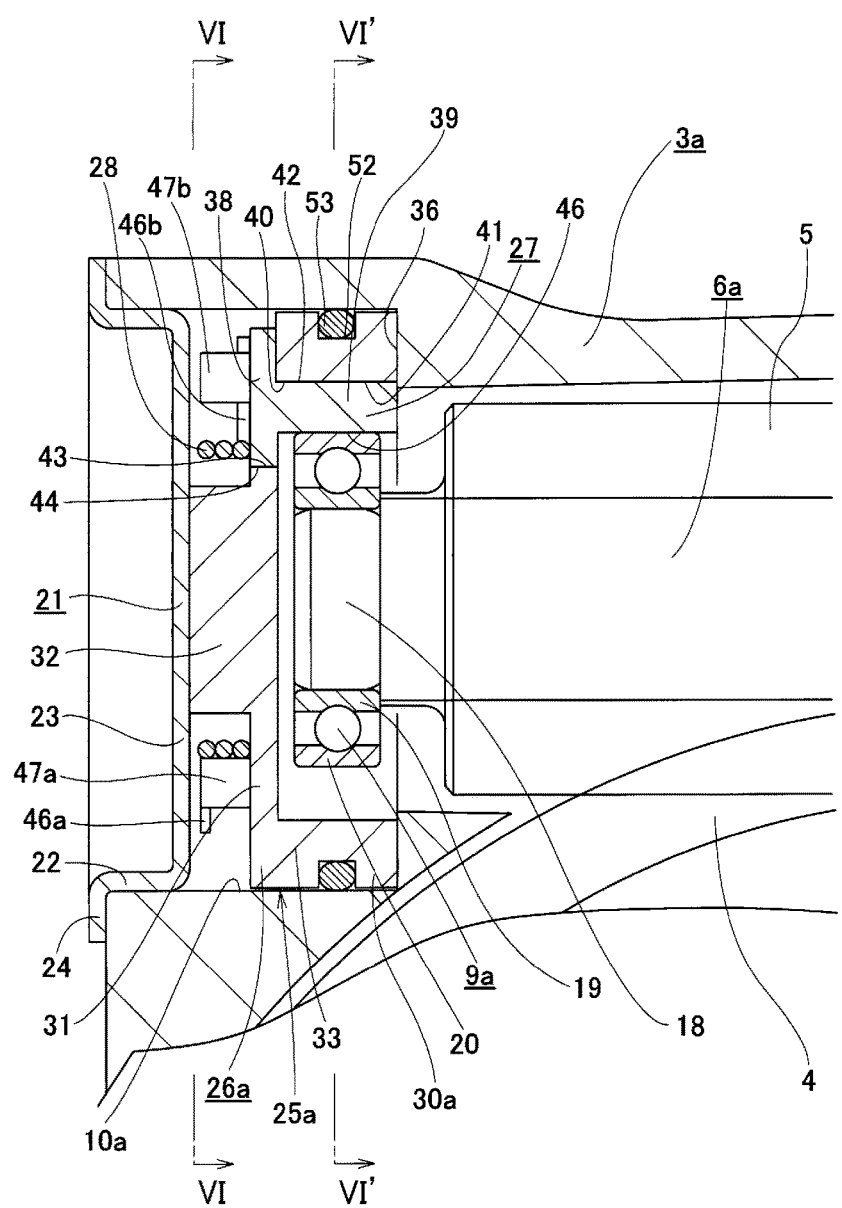
FIG. 5 is a drawing illustrating a second embodiment of the present invention, which is similar to FIG. 2.

A second embodiment of the present invention will be described with reference to FIGS. 5 and 6.

In the case of this embodiment, the configuration of biasing mechanism 25a is different in several points from that according to the first embodiment described above.

In the case of this embodiment, the outer circumferential surface of the outer ring 20 is in direct contact with the guide surface 37 and the wedge surface 45 instead of the leaf spring 29 for a bearing (refer to FIG. 3) being disposed between the outer circumferential surface of the outer ring 20 constituting the tip side bearing 9a and the guide surface 37 and between the outer circumferential surface of the outer ring 20 constituting the tip side bearing 9a and the wedge surface 45. Instead, in the case of this embodiment, a guide piece 30a constituting a guide member 26a is loosely and internally fitted into the inner circumferential surface of the holding recessed portion 10a of the housing 3a (a minute gap being disposed between an outer circumferential surface of the guide piece 30a and the inner circumferential surface of the holding recessed portion 10a), and a rubber-based O-ring 53 that is locked with a locking groove 52 which is formed over an entire circumference in an axial central portion of the outer circumferential surface of the guide piece 30a is elastically clamped between a bottom surface of the locking groove 52 and the inner circumferential surface of the holding recessed portion 10a. In the case of this embodiment, an axial inside surface of the guide piece 30a and an axial outer end face (tip surface) of the core portion 32 constituting the guide member 26a abut against the stepped surface 36 disposed on the inner circumferential surface of the housing 3a and the inside surface of the bottom plate portion 23 constituting the cap 21 in a state where radial sliding is facilitated, respectively.

In the case of this embodiment, perspective motions of the tip side bearing 9a and the guide piece 30a with respect to the worm wheel 4 are allowed based on an elastic deformation of the O-ring 53, which is an elastic member for a guide piece, in a case where the tip side bearing 9a and the guide piece 30a tend to exhibit the perspective motions with respect to the worm wheel 4 as a result of a change in the meshing position of the worm teeth 5 and the worm wheel 4 based on the dimensional error in the direction of rotation of the worm shaft 6a and the worm wheel 4 during the rotation of the worm shaft 6a and the worm wheel 4. As a result, a change in the biasing force of the worm teeth 5 with respect to the worm wheel 4 is suppressed, and a change in the frictional force that acts on the meshing portion of the worm wheel 4 and the worm teeth 5 is suppressed.

In the case of this embodiment, no leaf spring 48 for a preload (refer to FIG. 3) is disposed inside the guide piece 30a. As a result, an assembly portion for the leaf spring 48 for a preload, the circular arc-shaped part 49 that is pressed by the leaf spring 48 for a preload, and the like are disposed at no circumferential part of the guide piece 30a. In the case of this embodiment, the outer circumferential surface of the guide piece 30a is a simple cylindrical surface except at the part where the engaging projection portion 34 is disposed.

The second embodiment is similar to the first embodiment described above when it comes to the rest of the configuration and effect, and thus redundant illustration and description thereof will be omitted herein.

Third Embodiment

Figure 7:
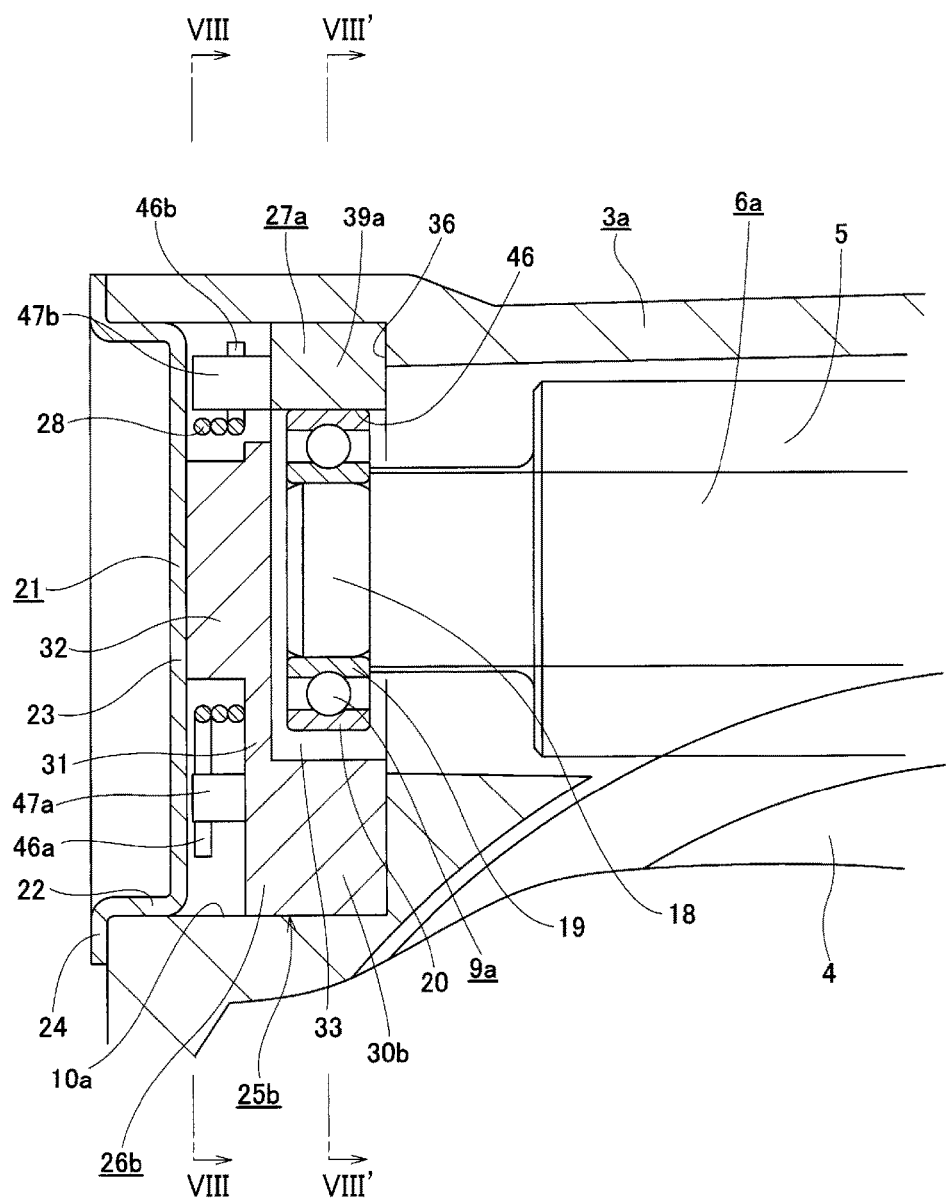
FIG. 7 is a drawing illustrating a third embodiment of the present invention, which is similar to FIG. 2.
Figure 8A:
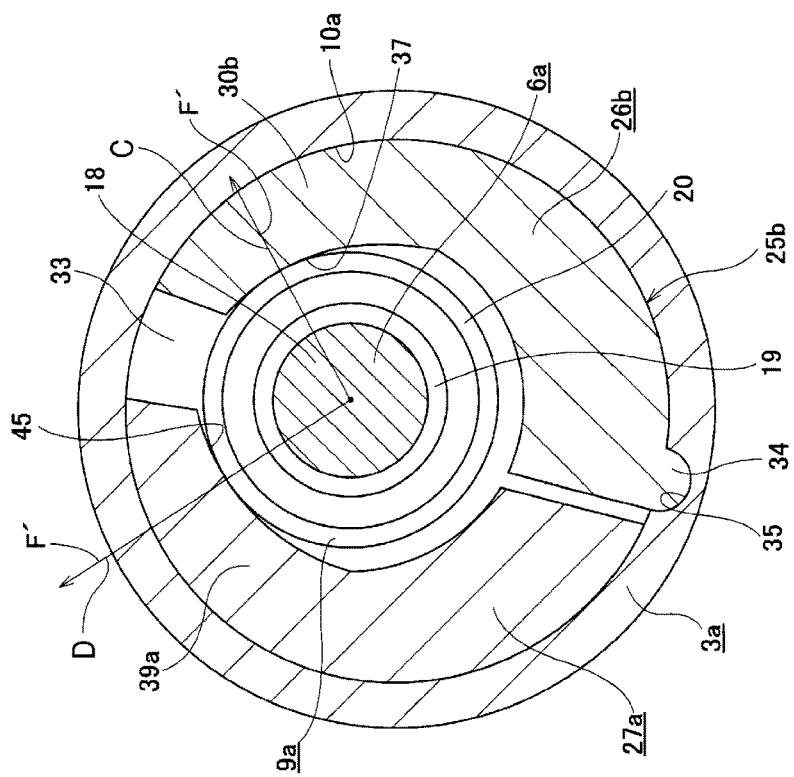
FIG. 8A is a cross sectional view taken along line VIII-VIII in FIG. 7.

A third embodiment of the present invention will be described with reference to FIGS. 7 and 8.

In the case of this embodiment, the configuration of biasing mechanism 25b is different in several points from that according to the first embodiment described above.

Figure 8B:
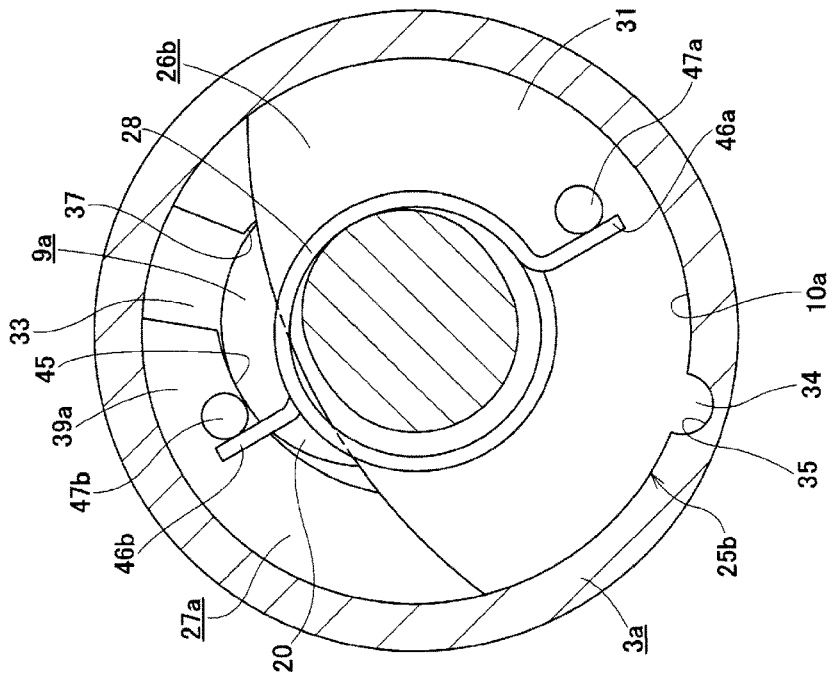
FIG. 8B is a cross sectional view taken along line VIII'-VIII' in FIG. 7.

In the case of this embodiment, as illustrated in FIG. 8B, each of a guide piece 30b constituting a guide member 26b and a wedge member 27a formed only from a wedge piece 39a is formed to have a semi-cylindrical shape, and the guide piece 30b and the wedge piece 39a are arranged at positions on the sides opposite to each other in the radial direction in the annular space 33 which is present between the inner circumferential surface of the holding recessed portion 10a disposed in the housing 3a and the outer circumferential surface of the outer ring 20 constituting the tip side bearing 9a. In this state, circumferential gaps are disposed between both of respective circumferential end faces of the guide piece 30b and the wedge piece 39a. In the case of this embodiment, the inner circumferential surface of the holding recessed portion 10a functions as a guiding face for a wedge piece for guiding an outer diameter side surface of the wedge member 27a in the circumferential direction.

In the case of this embodiment, no leaf spring 29 for a bearing (refer to FIG. 3) is disposed between the outer circumferential surface of the outer ring 20 and the guide surface 37 disposed on a bore diameter side surface of the guide piece 30b and between the outer circumferential surface of the outer ring 20 and the wedge surface 45 disposed on a bore diameter side surface of the wedge piece 39a. Instead, the outer circumferential surface of the outer ring 20 is in direct contact with the guide surface 37 and the wedge surface 45.

In the case of this embodiment, no leaf spring 48 for a preload (refer to FIG. 3) is disposed inside the guide piece 30b. As a result, the assembly portion for the leaf spring 48 for a preload, the circular arc-shaped part 49 that is pressed by the leaf spring 48 for a preload, and the like are disposed at no circumferential part of the guide piece 30b.

The third embodiment is similar to the first embodiment described above when it comes to the rest of the configuration and effect, and thus redundant illustration and description thereof will be omitted herein.

In a case where the electric power steering device according to the present invention is carried out, the member that has the guide piece and the member that has the wedge piece are not limited to those formed of synthetic resin and can be formed of metal such as aluminum alloy.

Each of the elastic member for a wedge piece, the elastic member for a bearing, and the elastic member for a guide piece is not limited to those used in the embodiments described above. Instead, elastic members such as various springs and rubber-based ones can be adopted as the elastic members.

Figure 9:
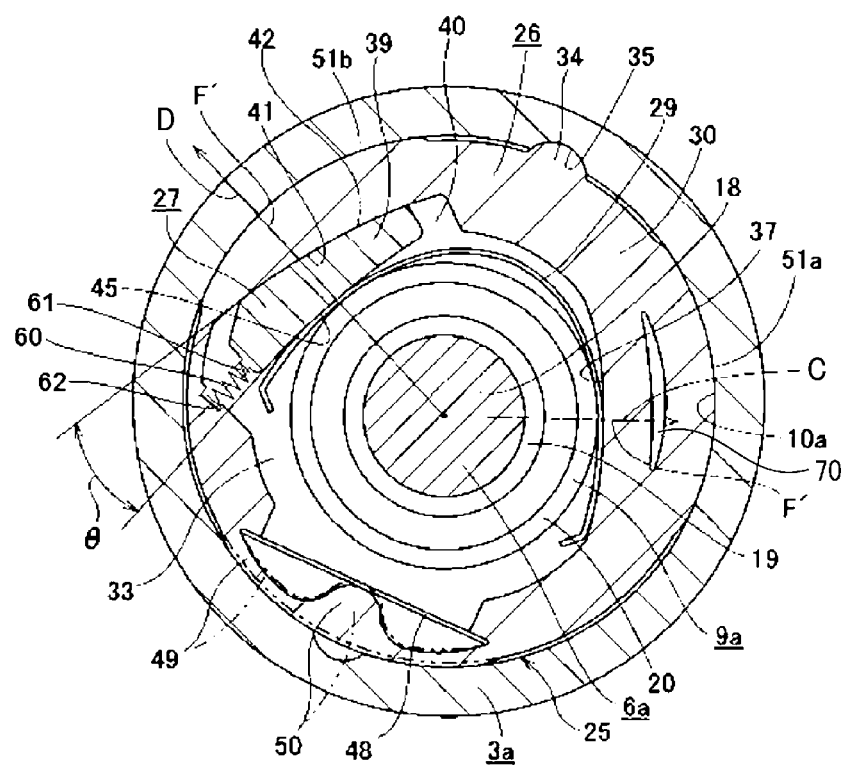
FIG. 9 is a drawing illustrating a modification example of the embodiments of the present invention, which is similar to FIG. 3B.

As illustrated in FIG. 9, the elastic force toward the one side in the circumferential direction may be applied to the wedge piece 39 by a compression coil spring 60 for a wedge piece being used instead of the coil spring 28 for a wedge piece. In this case, a projection 61 that guides a bore diameter portion of one edge of the compression coil spring 60 for a wedge piece is disposed in an edge of the wedge member 27 on the worm wheel 4 side. In addition, a recessed portion 62 that guides an outer diameter portion of the other edge of the compression coil spring 60 for a wedge piece is disposed in the inner circumferential surface of the guide piece 30 that faces the projection 61. Accordingly, the electric power steering device can be shortened by the same amount as an axial space for arranging the coil spring 28 for a wedge piece.

The disclosure of Japanese Patent Application No. 2014-181961 filed on Sep. 8, 2014 and the disclosure of Japanese Patent Application No. 2015-25910 filed on Feb. 13, 2015 including the specification, drawings and abstract are incorporated herein by reference in their entirety.

REFERENCE SIGNS LIST

1 Steering wheel
2 Steering shaft
3, 3a Housing
4 Worm wheel
5 Worm teeth
6, 6a Worm shaft
7 Electric motor
8, 8a Base end side bearing
9, 9a Tip side bearing
10, 10a Holding recessed portion
11 Holder
12 Bush
13 Preload pad
14 Coil spring
15 Intermediate shaft
16 Steering gear unit
17 Input shaft
18 Small diameter portion
19 Inner ring
20 Outer ring
21 Cap
22 Fitted cylindrical portion
23 Bottom plate portion
24 Outward flange portion
25, 25a, 25b Biasing mechanism
26, 26a, 26b Guide member
27, 27a Wedge member
28 Coil spring for wedge piece
29 Leaf spring for bearing
30, 30a, 30b Guide piece
31 Side plate portion
32 Core portion
33 Annular space
34 Engaging projection portion
35 Engaging recessed portion
36 Stepped surface
37 Guide surface
38 Base portion
39, 39a Wedge piece
40 Insertion opening
41 Guiding face for wedge piece
42 Guided surface
43 Guiding face for base portion
44 Guided surface
45 Wedge surface
46a, 46b Engaging portion
47a, 47b Pin 48 Leaf spring for preload
49 Circular arc-shaped part
50 Pressed portion
51a, 51b Partial cylindrical surface portion
52 Locking groove
53 O-ring
60 Compression coil spring for wedge piece
61 Projection
62 Recessed portion

The invention claimed is:
1. An electric power steering device comprising:
a housing;
a rotating shaft for steering disposed to be rotatable with respect to the housing and rotated by an operation of a steering wheel;
a worm wheel configured to rotate with the rotating shaft for steering inside the housing;
a worm shaft having worm teeth, the worm teeth meshing with the worm wheel;
a tip side bearing supporting a tip portion of the worm shaft to be rotatable with respect to the housing;
an electric motor having an output shaft engaged with a base edge of the worm shaft; and
biasing mechanism for biasing the worm teeth toward the worm wheel,
wherein the biasing mechanism includes a guide piece, a wedge piece, and an elastic member for the wedge piece,
wherein the guide piece is disposed between an outer circumferential surface of the tip side bearing and an inner circumferential surface of the housing and has a guide surface in direct contact with a circumferential part of the outer circumferential surface of the tip side bearing,
wherein the wedge piece is disposed between the outer circumferential surface of the tip side bearing and the inner circumferential surface of the housing in a state where the displacement relating to the circumferential direction of the annular space is allowed and has the wedge surface in direct contact with a part of the outer circumferential surface of the tip side bearing spaced apart from the circumferential part in the circumferential direction,
wherein the elastic member for the wedge piece applies elastic force toward one circumferential side to the wedge piece, and
wherein the biasing mechanism allows the tip side bearing to be displaced toward the worm wheel by allowing the wedge piece to be displaced toward the one circumferential side by the elastic force of the elastic member for the wedge piece.
2. The electric power steering device according to claim 1,
wherein the guide surface faces the outer circumferential surface of the tip side bearing in relation to a direction of a component of force within a virtual plane orthogonal to the worm shaft pertaining to a meshing reaction force applied to the worm shaft from a meshing portion of the worm wheel and the worm teeth when the steering wheel is rotated to one side in a lateral direction, and
wherein the wedge surface faces the outer circumferential surface of the tip side bearing in relation to a direction of a component of force within the virtual plane orthogonal to the worm shaft pertaining to a meshing reaction force applied to the worm shaft from the meshing portion when the steering wheel is rotated to the other side in the lateral direction.
3. The electric power steering device according to claim 1,
wherein an elastic member for a bearing applying elastic force toward the worm wheel side to the tip side bearing is clamped at parts between the outer circumferential surface of the tip side bearing and the guide surface and between the outer circumferential surface of the tip side bearing and the wedge surface.
4. The electric power steering device according to claim 3,
wherein a contact position of an inside surface of the elastic member for a bearing and the outer circumferential surface of the tip side bearing and contact positions of an outside surface of the elastic member for a bearing with respect to the guide surface and the wedge surface remain deviated from each other in relation to a length direction of the elastic member for a bearing in a state where no meshing reaction force is applied to the worm shaft from the meshing portion of the worm wheel and the worm teeth.
5. The electric power steering device according to claim 1,
wherein a guiding face for the wedge piece is disposed at a part spaced apart from the guide surface in relation to the circumferential direction on an inner circumferential surface of the guide piece, and
wherein the wedge piece has a guided surface conforming to the guiding face for the wedge piece and is guided to be capable of the displacement in relation to the circumferential direction.
6. The electric power steering device according to claim 1,
wherein the guide piece is formed to have an annular shape surrounding the tip side bearing, the guide piece is loosely and internally fitted into the inner circumferential surface of the housing, and an elastic member for the guide piece applying elastic force toward the worm wheel side to the guide piece is clamped between an outer circumferential surface of the guide piece and the inner circumferential surface of the housing.
7. The electric power steering device according to claim 1,
wherein the displacement of the guide piece relating to the circumferential direction is blocked by an engaging projection portion or an engaging recessed portion formed at a circumferential part of the outer circumferential surface of the guide piece being engaged with an engaging recessed portion or an engaging projection portion formed at a circumferential part of the inner circumferential surface of the housing.
8. An electric power steering device comprising:
a housing;
a rotating shaft for steering disposed to be rotatable with respect to the housing and rotated by an operation of a steering wheel;
a worm wheel configured to rotate with the rotating shaft for steering inside the housing;
a worm shaft having worm teeth, the worm teeth engaged with the worm wheel;
a tip side bearing supporting at least a portion of the worm shaft to be rotatable with respect to the housing;
an electric motor having an output shaft engaged with the worm shaft;

a biasing mechanism configured to move in a direction substantially perpendicular to a rotation axis of the worm shaft; and another elastic member for a bearing configured to apply an elastic force to the tip side bearing to bias the tip side bearing toward the worm wheel, wherein the biasing mechanism includes a wedge piece and an elastic member for urging the wedge piece, and wherein the wedge piece is provided between an outer circumferential surface of the tip side bearing and an inner circumferential surface of the housing.

9. The electric power steering device according to claim 8, wherein a thickness of the wedge piece decreases from a first end to an end opposite the first end in the circumferential direction.

10. The electric power steering device according to claim 8, the elastic member for the bearing is clamped between the outer circumferential surface of the tip side bearing and the wedge piece.

11. The electric power steering device according to claim 8, the elastic member for the bearing is provided between the inner circumferential surface of the housing and the wedge piece.

12. The electric power steering device according to claim 8, wherein the biasing mechanism is configured to bias the worm teeth toward the worm wheel.

13. An electric power steering device comprising:

a housing;

a rotating shaft for steering disposed to be rotatable with respect to the housing and rotated by an operation of a steering wheel;

a worm wheel configured to rotate with the rotating shaft for steering inside the housing;

a worm shaft having worm teeth, the worm teeth meshing with the worm wheel;

a tip side bearing supporting a tip portion of the worm shaft to be rotatable with respect to the housing;

an electric motor having an output shaft engaged with a base edge of the worm shaft; and biasing mechanism for biasing the worm teeth toward the worm wheel, wherein the biasing mechanism includes a guide piece, a wedge piece, and an elastic member for the wedge piece, wherein the guide piece is disposed between an outer circumferential surface of the tip side bearing and an inner circumferential surface of the housing and has a guide surface in contact via another member with a circumferential part of the outer circumferential surface of the tip side bearing, wherein the wedge piece is disposed between the outer circumferential surface of the tip side bearing and the inner circumferential surface of the housing in a state where the displacement relating to the circumferential direction of the annular space is allowed and has the wedge surface in contact via the another member with a part of the outer circumferential surface of the tip side bearing spaced apart from the circumferential part in the circumferential direction, wherein the elastic member for the wedge piece applies elastic force toward one circumferential side to the wedge piece, and wherein the biasing mechanism allows the tip side bearing to be displaced toward the worm wheel by allowing the wedge piece to be displaced toward the one circumferential side by the elastic force of the elastic member for the wedge piece.

* * * * *